(12) United States Patent
Chang

(10) Patent No.: US 6,843,491 B2
(45) Date of Patent: Jan. 18, 2005

(54) REAR SUSPENSION SYSTEM

(75) Inventor: Hyung-Bae Chang, Suwon (KR)

(73) Assignee: Hyundai Motor Company, Seoul (KR)

( * ) Notice: Subject to any disclaimer, the term of this patent is extended or adjusted under 35 U.S.C. 154(b) by 143 days.

(21) Appl. No.: 10/215,553

(22) Filed: Aug. 8, 2002

(65) Prior Publication Data
US 2003/0038444 A1 Feb. 27, 2003

(30) Foreign Application Priority Data
Aug. 21, 2001 (KR) .......................... 2001-50282

(51) Int. Cl.$^7$ ............................................. B60G 3/00
(52) U.S. Cl. ............................................. 280/124.125
(58) Field of Search .................. 280/124.125, 124.13, 280/5.522, 5.52, 5.524, 124.134, 124.135, 86.75, 86.757, 86.758

(56) References Cited

U.S. PATENT DOCUMENTS

| | | | | |
|---|---|---|---|---|
| 4,157,840 A | * | 6/1979 | Kroniger et al. | 280/124.134 |
| 4,453,733 A | * | 6/1984 | Sautter et al. | 280/86.75 |
| 4,458,915 A | * | 7/1984 | Emery | 280/5.524 |
| 4,542,920 A | * | 9/1985 | Kijima et al. | 280/5.524 |
| 4,706,989 A | * | 11/1987 | Iijima et al. | 280/5.524 |
| 4,714,270 A | * | 12/1987 | Rumpel | 280/124.144 |
| 4,720,121 A | * | 1/1988 | Kikuchi et al. | 280/124.128 |
| 4,758,018 A | * | 7/1988 | Takizawa et al. | 280/124.133 |
| 4,832,364 A | * | 5/1989 | Kikuchi et al. | 280/124.128 |
| 5,048,860 A | * | 9/1991 | Kanai et al. | 280/86.757 |
| 5,098,116 A | * | 3/1992 | Edahiro et al. | 280/5.524 |
| 5,102,159 A | * | 4/1992 | Sato et al. | 280/86.75 |
| 5,549,319 A | * | 8/1996 | Kring | 280/86.75 |
| 5,829,764 A | * | 11/1998 | Griffiths | 280/5.52 |
| 5,938,219 A | * | 8/1999 | Hayami et al. | 280/124.135 |
| 6,099,005 A | * | 8/2000 | Wakatsuki | 280/124.135 |
| 6,123,351 A | * | 9/2000 | Bruehl | 280/124.135 |
| 6,467,783 B1 | * | 10/2002 | Blondelet et al. | 280/124.106 |

* cited by examiner

Primary Examiner—Faye M. Flemming
(74) Attorney, Agent, or Firm—Morgan Lewis & Bockius LLP

(57) ABSTRACT

The present invention provides a rear suspension system for vehicles that effects suitable toe-in during braking and/or turning. The rear suspension system includes a lower arm mounted to a vehicle frame, the lower arm being displaced when receiving an external force; a mounting rod, one end of which is hingedly connected to one side of the lower arm; a wheel mounting unit, one end of which is connected to the mounting rod, a wheel being mounted on the wheel mounting unit; and a lever unit for rotating the mounting rod when the lower arm is displaced toward a rear of the vehicle frame.

4 Claims, 2 Drawing Sheets

REAR SUSPENSION SYSTEM

FIELD OF THE INVENTION

The present invention relates to a rear suspension system. More particularly, the present invention relates to a rear suspension system that effects toe-in during braking and/or turning to improve stability.

BACKGROUND OF THE INVENTION

A suspension system for a vehicle preferably provides for changes in toe-angle when wheels of the vehicle receive force from the road surface. For example, when the vehicle is leaning to one side such that the pressure received from the road surface on opposite wheels (i.e., left and right front wheels or left and right rear wheels) is different, the suspension system preferably effects changes in the toe-angle.

Toe-angle refers to the slanting of the front part of the wheel when viewed from above in relation to the direction in which the vehicle is traveling. When the front of the wheel is slanted inwardly, this is referred to as toe-in, while if the wheel is slanted outwardly, this is referred to as toe-out. To improve steering stability during operations such as when turning, it is preferable that suitable toe-in is effected for the rear wheels.

For example, when the driver operates the steering wheel for a right turn, the front wheels pivot by a corresponding amount. Accordingly, the rear wheels trail in the direction that the vehicle is traveling. If the rear wheels spread outwardly (that is, if the rear wheels experience toe-out), a curvature radius formed by a trace of the front wheels and the rear wheels becomes too small such that the vehicle turns by an amount greater than that desired by the driver. This is referred to as over-steer. If such a situation develops, steering control becomes too sensitive such that turning stability deteriorates. That is, it is possible that the driver may have to compensate for over-steer by turning the steering wheel in the opposite direction.

Therefore, it is preferable to effect a suitable amount of toe-in for the rear wheels to realize turning stability. If toe-in of the rear wheels is appropriately provided, a greater curvature radius results such that it becomes unnecessary for the driver to turn the steering wheel in the opposite direction to compensate for over-steer. Steering stability is therefore ensured.

A prior art system to effect toe-in of the rear wheels during braking and turning will now be described with reference to FIG. 1, which shows a plane view of a right rear wheel and a conventional rear suspension system for the same wheel.

As shown in the drawing, an extreme rear end of a lower arm 3 is connected to the vehicle body through bushings and an elastic plate 1. If a braking force is generated, the braking force acts on the wheel 2 along direction X such that a rearward force acts on the entire suspension system. As a result, a front end portion of the lower arm 3 moves diagonally in direction A1 following a bushing connection angle to experience displacement in a downward direction of the drawing (i.e., inwardly toward the vehicle body) by an amount (d).

Also, the rear end of the lower arm 3 moves in the rearward direction (i.e., along direction A2) as the elastic plate 1 undergoes deformation. Therefore, the lower arm 3 rotates counterclockwise (in the drawing) such that a long axis direction of the wheel changes into direction X' to thereby realize toe-in.

In the case a lateral force is applied to the wheel, only the elastic plate 1 supports the lateral force. However, the elastic plate 1 often provides sufficient strength to fully support such a force such that turning stability is reduced. Vibrations of the elastic plate 1 when traveling on an uneven road surface are also a problem.

SUMMARY OF THE INVENTION

The present invention provides a rear suspension system for vehicles. In a preferred embodiment, a lower arm is mounted to a vehicle frame, the lower arm being displaced when acted on by an external force. A mounting rod is hingedly connected at one end to one side of the lower arm. A wheel mounting unit is connected at one end to the mounting rod, with a wheel being mounted on the wheel mounting unit. A lever unit rotates the mounting rod when the lower arm is displaced toward a rear of the vehicle frame.

It is preferable that an end of the mounting rod toward a front of the vehicle frame is hingedly connected to one side of the lower arm. The lever unit rotates the mounting rod to be distanced from the lower arm when the lower arm is displaced toward the rear of the vehicle frame.

It is also preferable that a first groove is formed in the lower arm and a second groove is formed in the mounting rod. The lever unit is thus hingedly connected to the vehicle frame and includes a first lever positioned in the first groove and a second lever positioned in the second groove.

It is further preferable that a stopper is formed on the lower arm, the stopper limiting a maximum displacement of the mounting rod.

It is also preferable that a center line of a wheel mounted to the wheel mounting unit is more forward with reference to the vehicle frame than a mounting point of the mounting rod of the wheel mounting unit.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

Preferred embodiments of the present invention will now be described in detail with reference to the accompanying drawings.

Figure 1:
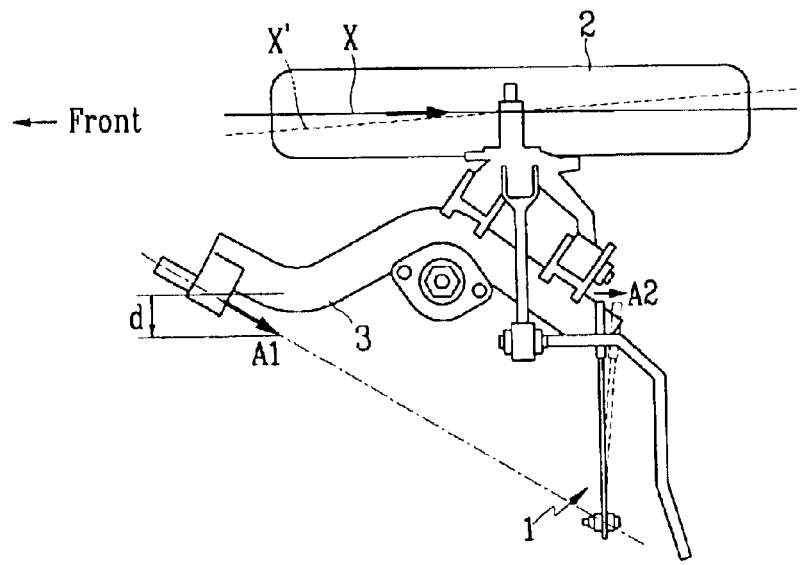
FIG. 1 is a top plan view of a conventional rear suspension system.
Figure 2:
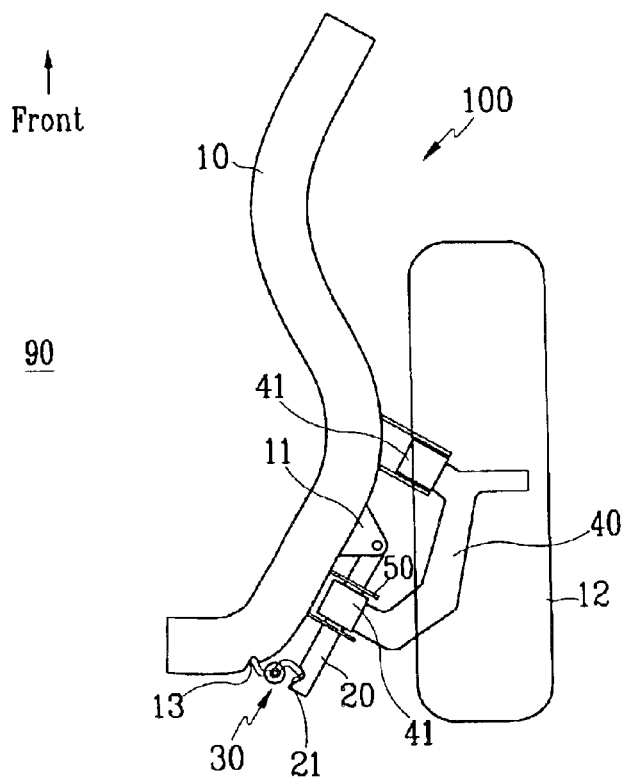
FIG. 2 is a top plan view of a rear suspension system according to a preferred embodiment of the present invention.

As shown in FIG. 2, a rear suspension system 100 according to a preferred embodiment of the present invention includes a lower arm 10 that is mounted to a vehicle frame 90, the lower arm 10 being displaced when receiving an external force. A mounting rod 20 is hingedly connected to the lower arm 10 at a first end; lever member 30 is hingedly connected to the vehicle frame 90 in proximity to the lower arm 10. A wheel mounting unit 40 is connected to the lower arm 10 at a first end and connected at its second end to a predetermined position on the mounting rod 20 for attachment of a rear wheel 12.

The lower arm 10 is mounted in proximity to the rear wheel 12 and includes a connector 11 that integrally extends toward the rear wheel 12. The first end of the mounting rod 20 is hingedly connected to the connector 11. A first groove 13 is formed in the lower arm 10 corresponding to a position of a second end of the mounting rod 20 when the first end of the same is connected to the connector 11.

The mounting rod 20 is rod-shaped, and, as described above, its first end is hingedly connected to the connector 11 of the lower arm 10. A second groove 21 is formed in a second end of the mounting rod 20. One end of the lever member 30, which is hingedly connected to the vehicle frame 90 in proximity to the lower arm 10 as described above, is positioned in the first groove 13 of the lower arm 10, and its other end is positioned in the second groove 21 of the mounting rod 20.

The first end of the wheel mounting unit 40 is connected to the lower arm 10 through a bushing 41, and the second end of the wheel mounting unit 40 is connected to the mounting rod 20 through another bushing 41. It is preferable that the second end of the wheel mounting unit 40 is connected to approximately a center portion of the mounting rod 20 in consideration of the suspension operation.

A stopper 50 is mounted on the lower arm 10 to the rear of the connector 11 such that a range of movement of the mounting rod 20 is limited. The stopper 50 is preferably a type of bracket.

Further, the center line of the wheel mounted to the wheel mounting unit is preferably positioned more forward than the mounting point of the first end of the mounting rod 20. Accordingly, toe-in is effected when a lateral force acts toward the vehicle frame 90 when turning. Other configurations for the wheel mounting unit may be readily evident from FIG. 2 by those skilled in the art.

Figure 3:
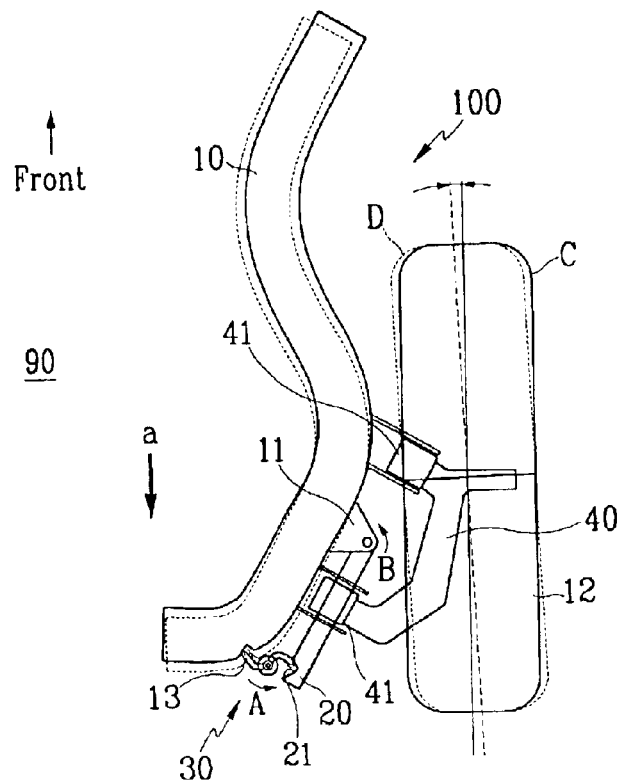
FIG. 3 shows the rear suspension system of FIG. 2 in a state where the vehicle is undergoing braking.

An operation of the rear suspension system 100 of the present invention structured as in the above will now be described, with reference to FIGS. 3 and 4. Turning first to FIG. 3, as a result of a braking force (a), the lower arm 10 deflects in the direction of the braking force (a). Therefore, lever member 30 rotates about its hinge in direction A and the mounting rod 20 rotates about the hinge of connector 11 in direction B. Accordingly, toe-in of the rear wheel 12 is effected, in which the rear wheel 12 is displaced from position C to position D.

Figure 4:
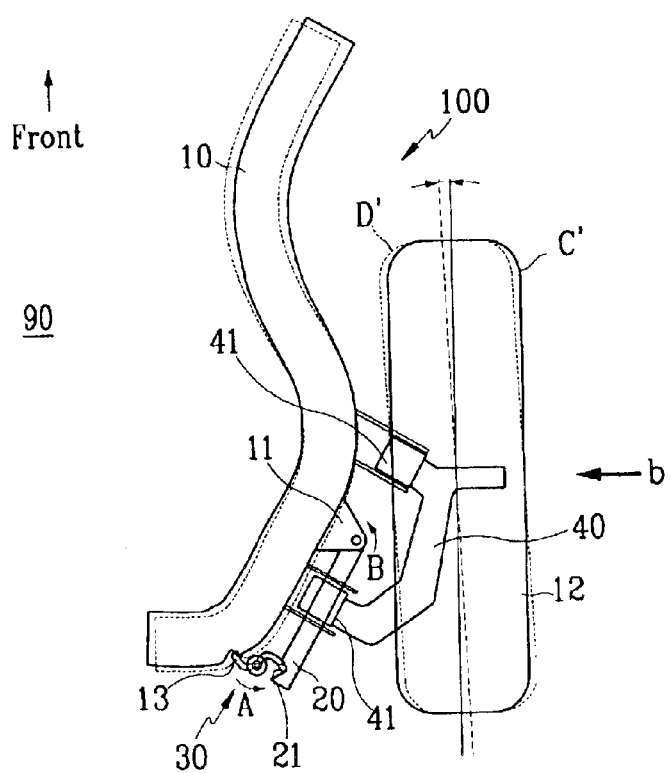
FIG. 4 shows the rear suspension system of FIG. 2 in a state where the vehicle is undergoing turning.

With reference to FIG. 4, as a result of a lateral force (a'), the lower arm 10 deflects in a direction of the lateral force (a'). Therefore, as with the application of the braking force (a), the lever member 30 rotates about its hinge in direction A and the mounting rod 20 rotates about the hinge of the connector 11 in direction B. Accordingly, toe-in of the rear wheel 12 is effected, in which the rear wheel 12 is displaced from position C' to position D'.

Hence, the rear suspension system 100 of the present invention effects toe-in of the rear wheel 12 during braking and turning.

The rear suspension system of the present invention provides at least the following advantages. First, braking stability is enhanced by effecting toe-in of the rear wheel during braking. Second, sufficient lateral strength is ensured, and turning stability is improved by effecting toe-in of the rear wheel when the vehicle is being turned.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A rear suspension system for vehicles, comprising:
   a lower arm configured to be mounted to a vehicle frame, the lower arm being displaced when receiving an external force;
   a mounting rod, one end of which is hingedly connected to one side of the lower arm;
   a wheel mounting unit, one end of which is connected to the mounting rod, a wheel being mountable on the wheel mounting unit; and
   a lever unit for rotating the mounting rod when the lower arm is displaced toward a rear of the vehicle frame, wherein a first groove is formed in the lower arm and a second groove is formed in the mounting rod, and the lever unit is hingedly connected to the vehicle frame and includes a first lever positioned in the first groove and a second lever positioned in the second groove.

2. The rear suspension system of claim 1, wherein an end of the mounting rod toward a front of the vehicle frame is hingedly connected to one side of the lower arm, and the lever unit rotates the mounting rod to be distanced from the lower arm when the lower arm is displaced toward the rear of the vehicle frame.

3. The rear suspension system of claim 1, wherein a stopper is formed on the lower arm, the stopper limiting a maximum displacement of the mounting rod.

4. A rear suspension system for vehicles, comprising:
   a lower arm configured to be mounted to a vehicle frame, the lower arm being displaced when receiving an external force;
   a mounting rod, one end of which is hingedly connected to one side of the lower arm;
   a wheel mounting unit one end of which is connected to the mounting rod, a wheel being mountable on the wheel mounting unit, wherein a center line of a wheel mounted to the wheel mounting unit is such that it is more forward with reference to the vehicle frame than a mounting point of the mounting rod of the wheel mounting unit; and
   a lever unit for rotating the mounting rod when the lower arm is displace toward a rear of the vehicle frame.

* * * * *